(12) United States Patent
Jeong et al.

(10) Patent No.: US 11,420,543 B2
(45) Date of Patent: *Aug. 23, 2022

(54) SEAT TRACK MECHANISM FOR VEHICLE

(71) Applicant: HYUNDAI TRANSYS INC., Seosan-si (KR)

(72) Inventors: Soo Hwan Jeong, Anyang-si (KR); Jae Sung Lee, Osan-si (KR); Jae Sang Lim, Osan-si (KR)

(73) Assignee: HYUNDAI TRANSYS INC., Chungcheongnam-Do (KR)

(*) Notice: Subject to any disclaimer, the term of this patent is extended or adjusted under 35 U.S.C. 154(b) by 209 days.

This patent is subject to a terminal disclaimer.

(21) Appl. No.: 16/530,115

(22) Filed: Aug. 2, 2019

(65) Prior Publication Data

US 2020/0198502 A1 Jun. 25, 2020

(30) Foreign Application Priority Data

Dec. 20, 2018 (KR) .................. 10-2018-0165837

(51) Int. Cl.
*B60N 2/42* (2006.01)
*B60N 2/02* (2006.01)
*B60N 2/06* (2006.01)

(52) U.S. Cl.
CPC .......... *B60N 2/43* (2013.01); *B60N 2/0232* (2013.01); *B60N 2/067* (2013.01)

(58) Field of Classification Search
CPC ...... B60N 2/067; B60N 2/073; B60N 2/0837; B60N 2/0843; B60N 2/0856; B60N 2/43; B60N 2/0232; B60N 2/08; B60N 2/0831; B60N 2/085

USPC ................................. 248/424, 429, 430
See application file for complete search history.

(56) References Cited

U.S. PATENT DOCUMENTS

| | | | | |
|---|---|---|---|---|
| 6,517,041 B2 * | 2/2003 | Raum | .............. | B60N 2/072 248/222.12 |
| 7,357,051 B2 * | 4/2008 | Raum | .............. | B60N 2/0806 248/424 |
| 7,607,835 B2 * | 10/2009 | Keller | .............. | F16C 29/0633 74/89.32 |
| 9,067,514 B2 * | 6/2015 | Oh | .............. | B60N 2/0843 |

(Continued)

FOREIGN PATENT DOCUMENTS

| | | | | |
|---|---|---|---|---|
| CN | 103492224 A | 1/2014 | | |
| EP | 0242859 A2 * | 10/1987 | ............. | B60N 2/043 |
| KR | 1020100030415 A | 3/2010 | | |

*Primary Examiner* — Jonathan Liu
*Assistant Examiner* — Guang H Guan

(57) ABSTRACT

The present disclosure provides a seat track mechanism installed beneath a vehicle seat in order to move the vehicle seat in the forward and backward directions. A monotrack mechanism, to which a monopost structure and a single rail structure are applied, is installed at the bottom of the seat. The seat track mechanism includes a structure for hook-engaging lower and upper rails constituting the mono track mechanism by hook guides, thereby being capable of securing sufficient strength upon head-on or rear-end collision. The present disclosure also provides a seat track mechanism for a vehicle including a locking mechanism capable of enhancing stability of a passenger through structural reinforcement given at the bottom of the vehicle when it is necessary to ensure safety of the passenger in a situation such as collision or sudden stop or the like.

20 Claims, 11 Drawing Sheets

(56) References Cited

U.S. PATENT DOCUMENTS

| | | | | |
|---|---|---|---|---|
| 9,321,375 B2* | 4/2016 | Lucas | ................... | B60N 2/0825 |
| 10,814,747 B2* | 10/2020 | Angerer | ................. | B60N 2/067 |
| 11,065,986 B2* | 7/2021 | Emrich | .................... | B60N 2/43 |
| 11,110,823 B2* | 9/2021 | Lee | ........................ | B60N 2/072 |
| 11,173,809 B2* | 11/2021 | Imamura | .............. | B60N 2/0715 |
| 2020/0130538 A1* | 4/2020 | Emrich | ................ | B60N 2/0705 |
| 2020/0189422 A1* | 6/2020 | Lee | ........................ | B60N 2/067 |
| 2020/0189427 A1* | 6/2020 | Huf | ....................... | B60N 2/067 |
| 2020/0198501 A1* | 6/2020 | Lee | ........................ | B60N 2/08 |
| 2020/0198502 A1* | 6/2020 | Jeong | ...................... | B60N 2/08 |

* cited by examiner

SEAT TRACK MECHANISM FOR VEHICLE

CROSS-REFERENCE TO RELATED APPLICATION

This application claims under 35 U.S.C. § 119(a) the benefit of priority to Korean Patent Application No. 10-2018-0165837 filed on Dec. 20, 2018. The aforementioned priority application is hereby incorporated by reference in its entirety for all purposes.

BACKGROUND

(a) Technical Field

The present disclosure generally relates to a seat track mechanism for a vehicle, and more particularly to a seat track mechanism installed beneath a vehicle seat in order to move the vehicle seat in the forward and backward directions.

(b) Background Art

Various components are provided as part of the vehicle seat in order to provide enhanced ride comfort and convenience to a driver or passenger. One of such components is a seat track mechanism configured to move a seat forward and rearward on the basis of the body type of a driver or passenger sitting thereon. Such a seat track mechanism includes a pair of rails installed beneath a seat such that the seat can move forward and rearward along the rails.

The above information disclosed in this background section is only for enhancement of understanding of the background of the invention and therefore it may contain information that does not form the prior art that is already known in this country to a person of ordinary skill in the art.

SUMMARY OF THE DISCLOSURE

Embodiments of the present disclosure have been made in an effort to solve the above-described problems associated with the prior art.

Embodiments of the present disclosure include a seat track mechanism for a vehicle. The track structure thereof mounted to the bottom of a seat employs a single rail structure rather than a double rail structure, thereby not only achieving slimness and autonomy associated with design of the seat bottom, but also simplifying the overall structure through a reduction in the number of constituent elements.

Embodiments of the present disclosure also include to a seat track mechanism for a vehicle which is capable of enhancing stability of a passenger through structural reinforcement given at the bottom of the vehicle when it is necessary to ensure safety of the passenger in a situation such as collision or sudden stop or the like, in association with application of a single rail structure.

In one aspect, a seat track mechanism for a vehicle includes a lower rail for fixing to a body of the vehicle, an upper rail mounted to a seat of the vehicle, and movable forward and rearward along the lower rail, and a locking mechanism mounted to the upper rail and adapted to control a rail gap between the locking mechanism and the lower rail, thereby restraining movement of the upper rail.

In an embodiment, the locking mechanism may include a center case fixedly mounted on the upper rail, and a center plate received in the center case, the center plate contacting the center case, to transmit an actuating force to the center case.

In still another embodiment, the seat track mechanism may further include a driver for providing an actuating force to move the upper rail forward and rearward along the lower rail. The center plate may be mounted to the driver.

In yet another embodiment, the driver may include a lead screw rotatably mounted to the lower rail, a motor for rotating the lead screw, and a nut member mounted to the upper rail and formed with female threads having a shape corresponding to a screw shape of the lead screw. The nut member may move forward and rearward in accordance with rotation of the lead screw.

In still yet another embodiment, the center case may include a pair of fingers hinged to the center case within the center case, to press the lower rail, and the center plate may include a pressing head contacting inner head contact surfaces of the fingers, respectively.

In still yet another embodiment, at least one cavity may be formed within the pressing head In still yet another embodiment, the center case may include a lower case supporting the center plate, and an upper case assembled to the lower case and mounted to a lower portion of the upper rail. The fingers may be hinged to the lower case.

In still yet another embodiment, the actuating force of the driver may be transmitted to the center case via the head contact surface of the fingers contacting the pressing head.

In still yet another embodiment, the fingers may press the lower rail while being widened toward the lower rail when a relative displacement difference is generated between the center case and the center plate due to a vehicle acceleration variation equal to or greater than a predetermined reference value.

In still yet another embodiment, each of the fingers may have a pressing surface formed opposite to the head contact surface of the finger, and a pressing pad may be disposed between the pressing surface of the finger and the lower rail.

In still yet another embodiment, the pressing pad may be installed on the center case in such a manner that a predetermined gap is maintained between the pressing pad and the lower rail when the pressing pad is not pressed by the finger, and the gap between the pressing pad and the lower rail may become zero when the pressing pad is pressed by the finger.

In still yet another embodiment, a pair of elastic members may be installed at the center case, to provide a restoring force for narrowing the fingers inwards.

In still yet another embodiment, the elastic members may be plate springs for applying an inward force to the fingers, respectively.

In still yet another embodiment, the lower rail may include a pair of hook guides provided at a central lower portion of the lower rail, and the locking mechanism may be disposed between the hook guides, and controls the rail gap when the fingers press the hook guides disposed adjacent thereto, respectively.

In still yet another embodiment, the center plate may have a symmetrical structure including the pressing head, a rod connected to the pressing head and another pressing head connected to the rod, and the center case may further include another pair of fingers connecting the other pressing head.

In still yet another embodiment, the pressing head may have round actuating surfaces facing the head contact surfaces of the fingers, respectively, and at least a portion of each of the actuating surfaces may contact a corresponding one of the head contact surfaces.

Other embodiments of the invention are discussed infra.

It is understood that the terms "vehicle", "vehicular" and other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
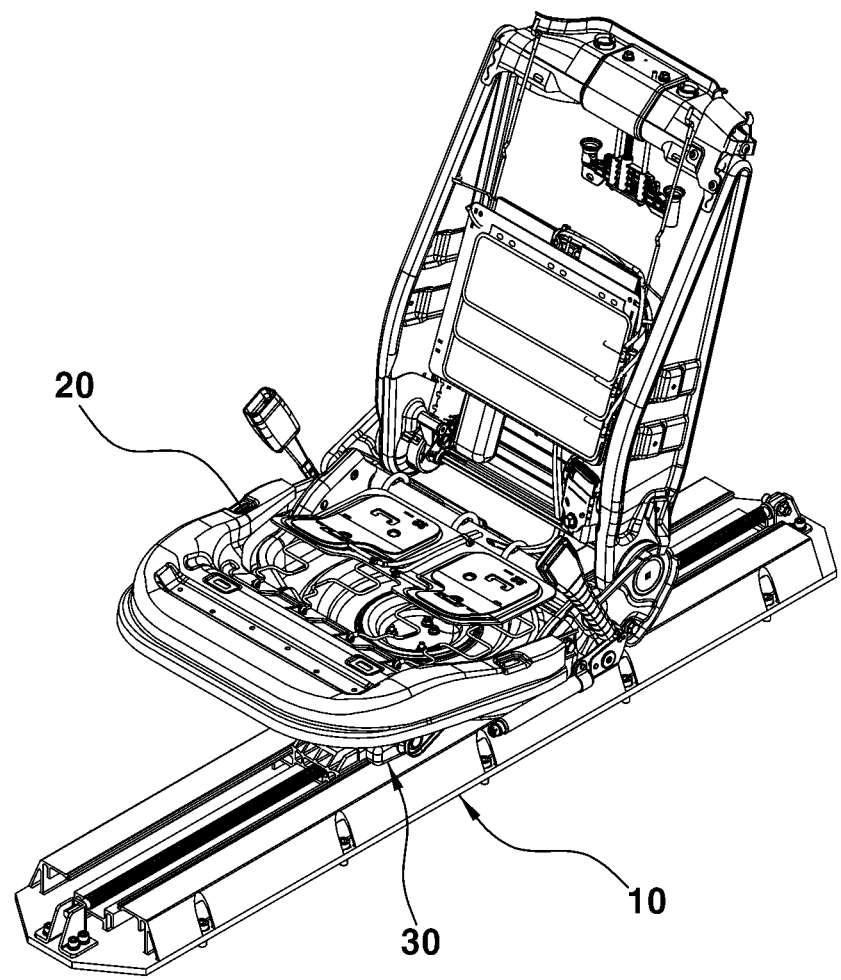
FIG. 1 is a perspective view illustrating a seat for a vehicle to which a seat track mechanism according to an exemplary embodiment of the present invention is mounted.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments, which may be within the spirit and scope of the invention as defined by the appended claims.

Embodiments of the present disclosure include a seat track mechanism for a vehicle, and more particularly a seat track mechanism for a vehicle in which a monopost and a monotrack are applied to the bottom of a seat in order to achieve slimness in design of the seat bottom and to secure freedom of movement of the seat. In particular, in embodiments of the present disclosure, a monopost structure is applied in order to achieve various seat operations required in an autonomous vehicle, and a rail structure for sliding the monopost structure forward and rearward is installed beneath the monopost structure. The present disclosure also relates to a seat track mechanism for a vehicle in which sufficient strength reinforcement is given to cope with external collision of the vehicle in association with application of monopost and monorail structures.

Hereinafter, a seat track mechanism for a vehicle according to an exemplary embodiment of the present disclosure will be described with reference to the annexed drawings.

Figure 2:
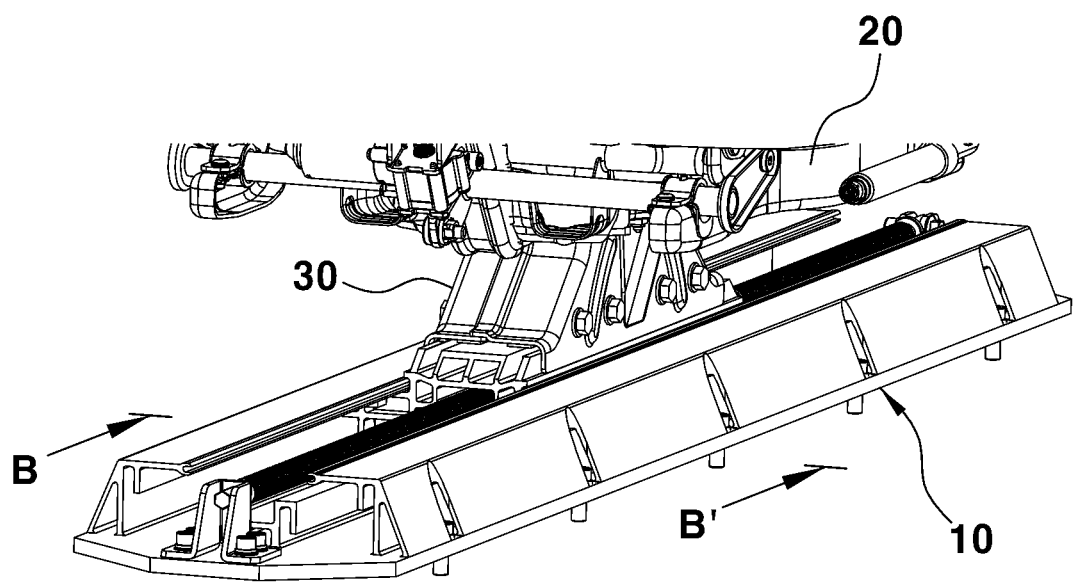
FIG. 2 is a perspective view illustrating a monotrack structure mounted to the bottom of a seat included in the seat track mechanism according to the exemplary embodiment.

FIG. 1 illustrates a seat for a vehicle to which a seat track mechanism according to an exemplary embodiment of the present disclosure is mounted. FIG. 2 is a monotrack structure mounted to the bottom of a seat included in the seat track mechanism according to the exemplary embodiment.

As illustrated in FIG. 1, in association with the vehicle seat track mechanism according to the exemplary embodiment of the present disclosure, a monopost 30 is installed on a lower portion of a seat 20. In detail, the monopost 30 is installed on a seat rail in such a manner that the monopost 30 is slidable forward and rearward.

In particular, as illustrated in FIG. 2, the monopost 30 installed on the lower portion of the vehicle seat 20 may be a structure having a single post shape. The monopost 30 is mounted on an upper rail 200. The upper rail 200, on which the monopost 30 is mounted, is coupled to a lower rail 100 in such a manner that the upper rail 200 is slidable on the lower rail 100. Preferably, the upper rail 200 receives sliding operation force from a driver including a motor 320. Accordingly, the seat 20 mounted on the upper rail 200 can move forward and rearward along the lower rail 100 fixed to a vehicle body by means of the upper rail 200 and the monopost 30.

Thus, the vehicle seat track mechanism according to the exemplary embodiment of the present disclosure is a seat track mechanism 10 suitable for the monopost structure installed on the lower portion of the seat 20, and is characterized by providing a monotrack mechanism including the upper rail 200 connected to the monopost 30 and the lower rail 100 configured to allow sliding of the upper rail 200 thereon.

In detail, in the present disclosure, seat rails including the upper rail 200 and lower rail 100, and the driver including a lead screw 310 as well as the motor 320 to enable sliding of the upper rail 200 are collectively referred to as the "seat track mechanism 10". In regard with this, the seat track mechanism 10 in the present disclosure means the entirety of the mechanism coupled to the monopost 30 mounted on the lower portion of the seat 20 in order to move the seat 20. Configurations disposed beneath the monopost 30 in FIG. 2 may be referred to as the "seat track mechanism 10".

Meanwhile, although the exemplary embodiment of the present disclosure proposes an example in which the seat track mechanism includes the motor-driven driver operating by the motor 320, a manually-driven driver other than the motor-driven driver may be used. That is, the seat track mechanism 10 may have a configuration in which the driver or passenger slides the seat 20 by directly applying operating force to the seat 20, and locks the seat 20 at a desired position by a locking device included in the seat track mechanism 10. In addition, although the illustrated embodiment proposes the motor-driven driver including the motor 320 and the lead screw 310, drivers of other types may be used, so long as they are applicable to the monotrack structure capable of achieving sliding of the upper rail 200.

Figure 3:
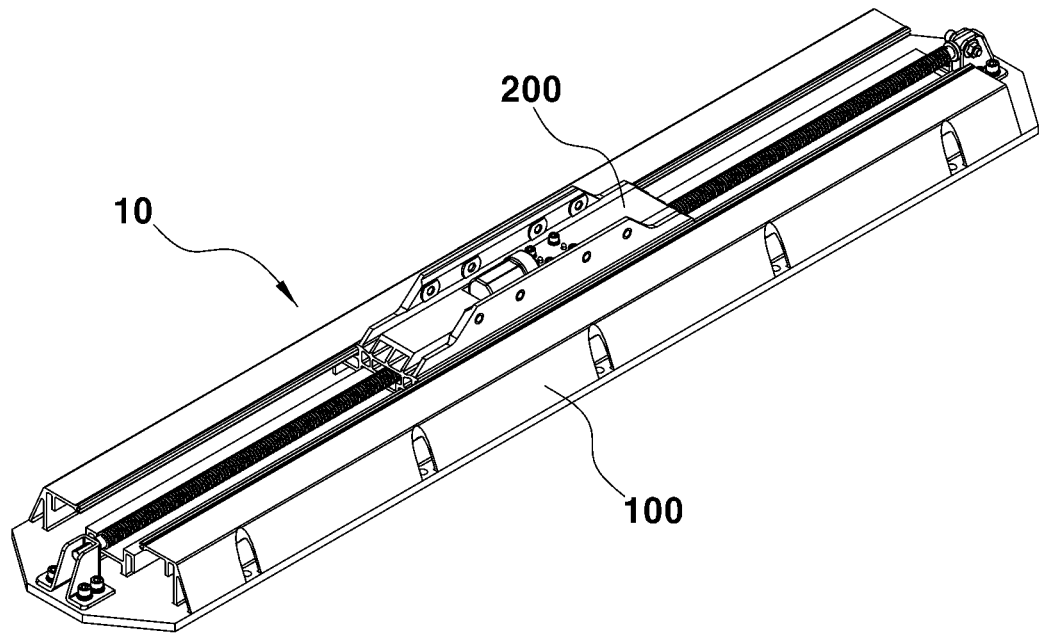
FIG. 3 is a perspective view illustrating the seat track mechanism according to the exemplary embodiment.
Figure 4:
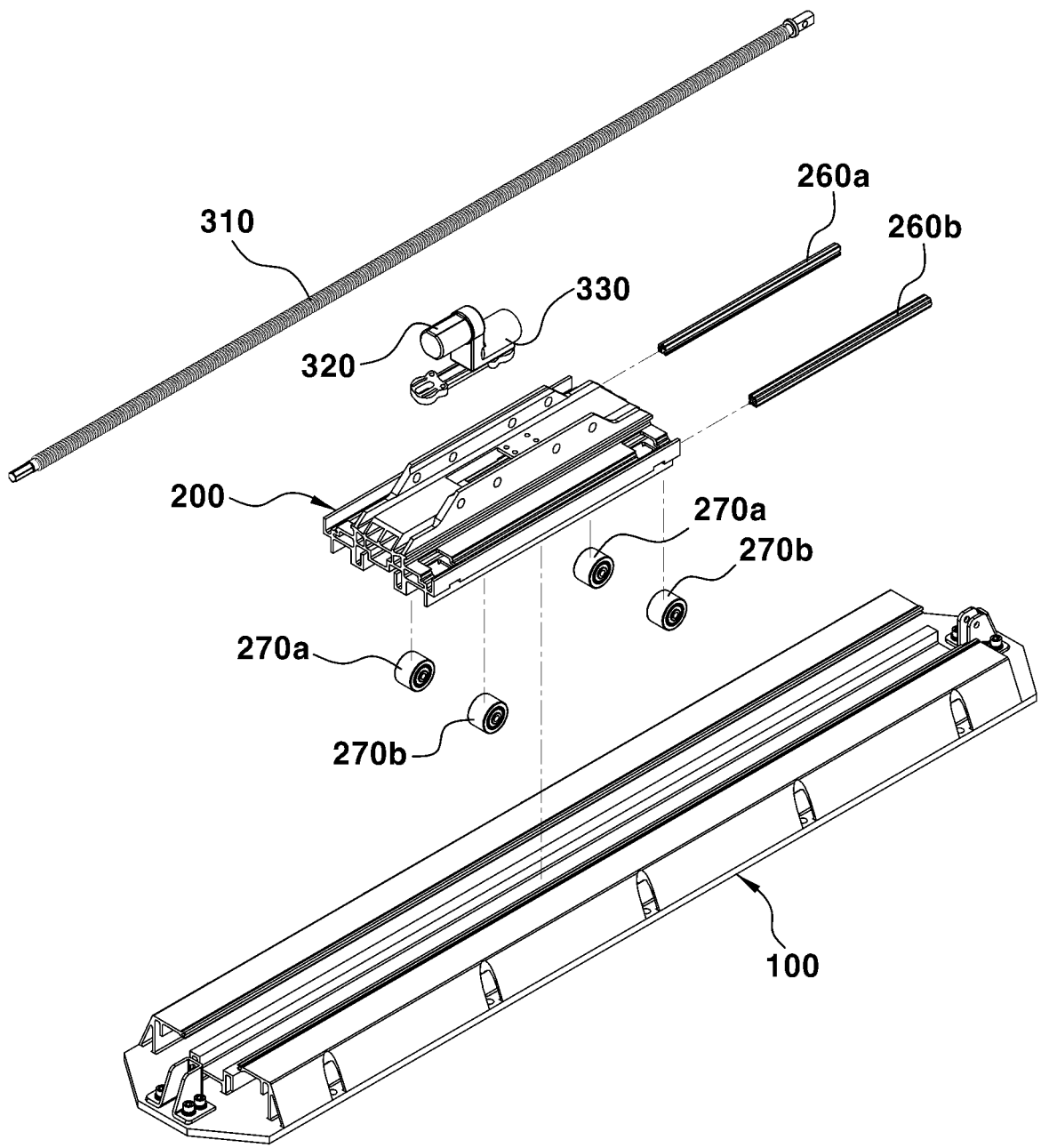
FIG. 4 is an exploded perspective view illustrating the detailed configuration of the seat track mechanism shown in FIG. 3.

FIG. 3 illustrates a detailed configuration of the above-described seat track mechanism 10. FIG. 4 illustrates an exploded state of the detailed configuration of the seat track mechanism 10 shown in FIG. 3.

Referring to FIGS. 3 and 4, the vehicle seat track mechanism 10 according to the illustrated embodiment has a configuration including the lower rail 100 mounted to the vehicle body at a lower portion of the vehicle, and the upper rail 200 coupled to the lower rail 100 in such a manner that the upper rail 200 moves forward and rearward along the lower rail 100. In particular, the upper rail 200 in the illustrated embodiment is a configuration for mounting and supporting the monopost 30. That is, the upper rail 200 is configured to slide forward and rearward while substantially supporting the seat 20 to which the monopost 30 is mounted. To this end, a mounting bracket 230 may be formed at an upper end of the upper rail 200, for mounting of the monopost 30. The monopost 30 may be mounted to the mounting bracket 230. Although FIG. 4 illustrates an example in which a pair of mounting brackets 230 is formed at the upper end of the upper rail 200, the number and shape of the mounting brackets 230 may be varied. Any number and shape of the mounting brackets 230 may be applied without limitation, so long as the mounting brackets 230 allow mounting and fixing of the monopost 30 thereto beneath the seat 20 without interfering with movement of the upper rail 200. The upper rail 200 and lower rail 100 may be made of a metal material, preferably, aluminum.

In addition, the upper rail 200 of the vehicle seat track mechanism 10 according to an embodiment of the present disclosure is slidable along the lower rail 100. In the illustrated embodiment, the upper rail 200 is configured to move forward and rearward while sliding by the driver. In detail, as illustrated in FIGS. 3 and 4, the vehicle seat track mechanism 10 according to the illustrated embodiment includes the lead screw 310, which extends in a longitudinal direction of the lower rail 100 and is fixed to opposite longitudinal ends of the lower rail 100, and the motor 320, which rotates the lead screw 310. Although not shown, the motor 320 has a rotational shaft connectable to a gearing for transmitting rotational force to the lead screw 310. Alternatively, the rotational shaft of the motor 320 may be directly connected to the lead screw 310.

In addition, a nut member 330 formed with female threads having a shape corresponding to a screw shape of the lead screw 310 is coupled to the lead screw 310. The nut member 330 is mounted on the upper rail 200. Accordingly, as the lead screw 310 rotates, the nut member 330 mounted on the upper rail 200 moves forward or rearward. When the motor 320 is driven, the upper rail 200 moves forward or rearward along the lead screw 310, together with the nut member 330.

In this case, the nut member 330 may have a structure in which the female threads corresponding to the shape of the lead screw 310 are formed at an inner portion of the nut member 330, and a plurality of bolt holes is formed at an outer portion of the nut member 330, for mounting of the nut member 330 to the upper rail 200. In the example of FIG. 4, four bolt holes are formed at an upper portion of the nut member 330. When bolting is achieved at the four bolt holes, the nut member 330 is firmly fastened to the upper rail 200. Accordingly, as the lead screw 310 rotates during driving of the motor 320, the nut member 330 and the upper rail 200, which are coupled to the lead screw 310, move forward or rearward.

Figure 5:
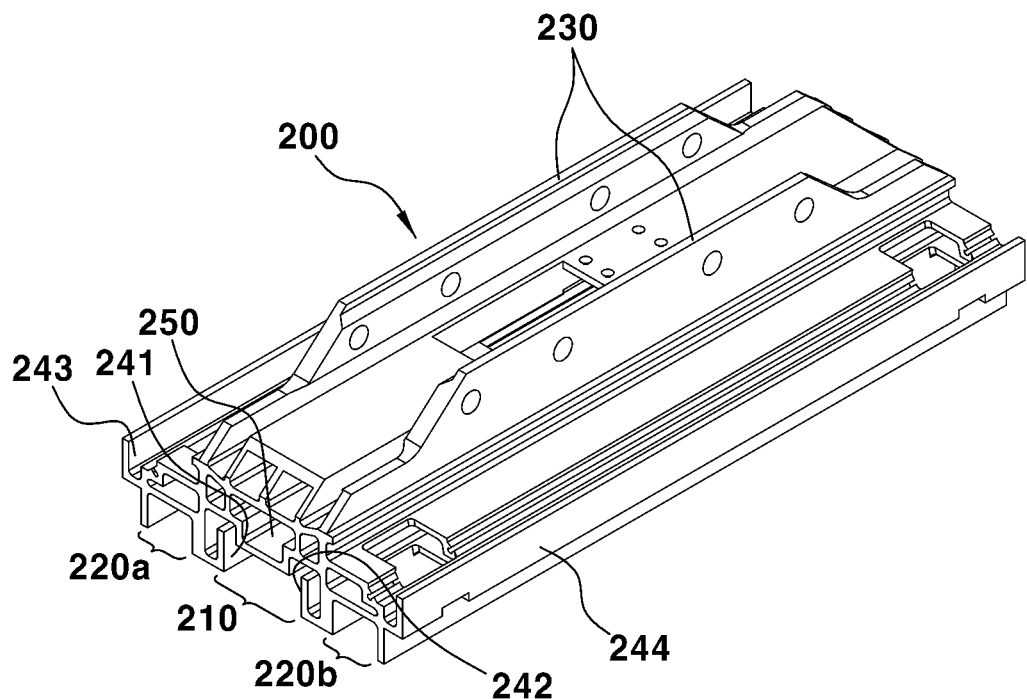
FIG. 5 is a perspective view illustrating an upper rail of the seat track mechanism according to the exemplary embodiment.

To this end, as illustrated in FIG. 5, the upper rail 200 is provided with a fastening section, to which the nut member 330 is fastened, and a through hole 250, through which the lead screw 310 extends.

In particular, in an exemplary embodiment of the present disclosure, the upper rail 200 includes a body 210, to which the nut member 330 is mounted and fastened, and a through hole 250, through which the lead screw 310 extends, is formed through the body 210. In addition, a pair of wings 220a and 220b is formed at the body 210, to extend longitudinally from opposite lateral ends of the body 210. Hook guides are also provided at the body 210 and the wings 220a and 220b.

Figure 7:
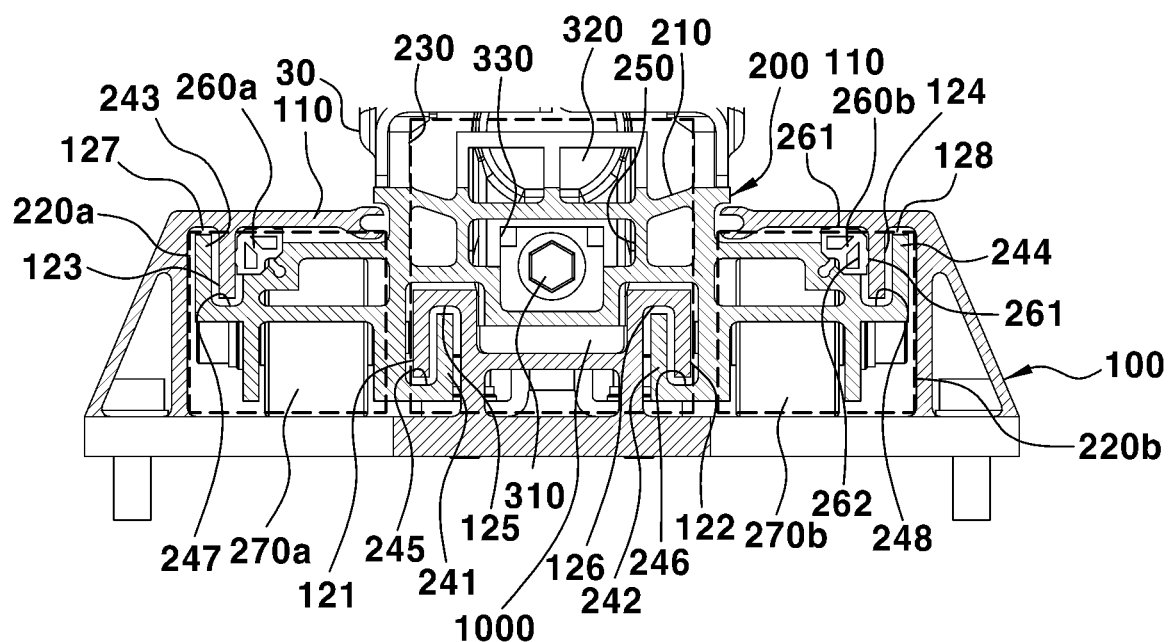
FIG. 7 is a cross-sectional view of the seat track mechanism according to the exemplary embodiment taken along line B-B' in FIG. 2.

In particular, the lower rail 100 is configured to have a structure enclosing at least a portion of each of the wings 220a and 220b in the upper rail 200, to enable the seat track structures connected by the monopost 30 to provide sufficient structural stability. That is, as illustrated in FIGS. 2 and 7, etc., the wings 220a and 220b of the upper rail 200 are configured to be sufficiently enclosed by opposite covers 110 of the lower rail 100. Hook engagement is achieved inside the covers 110 by means of hook guides of the upper rail 200 and lower rail 100. The configuration of the hook guides and the hook engagement by the hook guides will be described later.

Preferably, the lead screw 310 is inserted into the upper rail 200 through the through hole 250 under the condition that the nut member 330 is coupled to the lead screw 310. In this state, the lead screw 310 is rotatably mounted to front and rear mounting brackets 131 and 132 of the lower rail 100.

In addition, to assist forward and rearward movement of the upper rail 200, a plurality of rollers 270a and 270b may be mounted on a lower portion of the upper rail 200. The rollers 270a and 270b may be rotatably mounted to the upper rail 200, to allow forward and rearward movement of the upper rail 200 while being in linear contact with the lower rail 100 at bottom surfaces thereof. The rollers 270a and 270b may include a left roller (designated by reference numeral "270a") arranged at the left side of the upper rail 200 and a right roller (designated by reference numeral "270b") arranged at the right side of the upper rail 200. Preferably, two left rollers 270a and two right rollers 270b may be installed, as illustrated in FIG. 4.

That is, the seat track mechanism 10 according to the illustrated embodiment has configurations in which the upper rail 200 is moved forward and rearward by the rollers 270a and 270b as well as the driver including the motor 320 and the lead screw 310, and the lower rail 100 disposed beneath the upper rail 200 guides movement of the upper rail 200 while achieving mounting of the lead screw 310 thereto.

In addition, the vehicle seat track mechanism 10 according to the illustrated embodiment of the present disclosure is configured to be connected to a single post, that is, the monopost 30, as a post for connecting the seat track mechanism 10 to the seat 20. In connection with this, the seat track mechanism 10 is configured to solve movement of the seat 20 transferred to the upper rail 200 via the monopost 30 and concentration of load caused by movement of the seat 20. In particular, the vehicle seat track mechanism 10 according to the illustrated embodiment of the present disclosure is characterized in that the upper rail 200 and the lower rail 100 are configured to be hook-engaged by rail guides extending vertically at at least four places arranged in a width direction of the seat track mechanism 10, in order to obtain improved strength upon lateral damage to the vehicle seat or head-on or rear-end collision.

Figure 6:
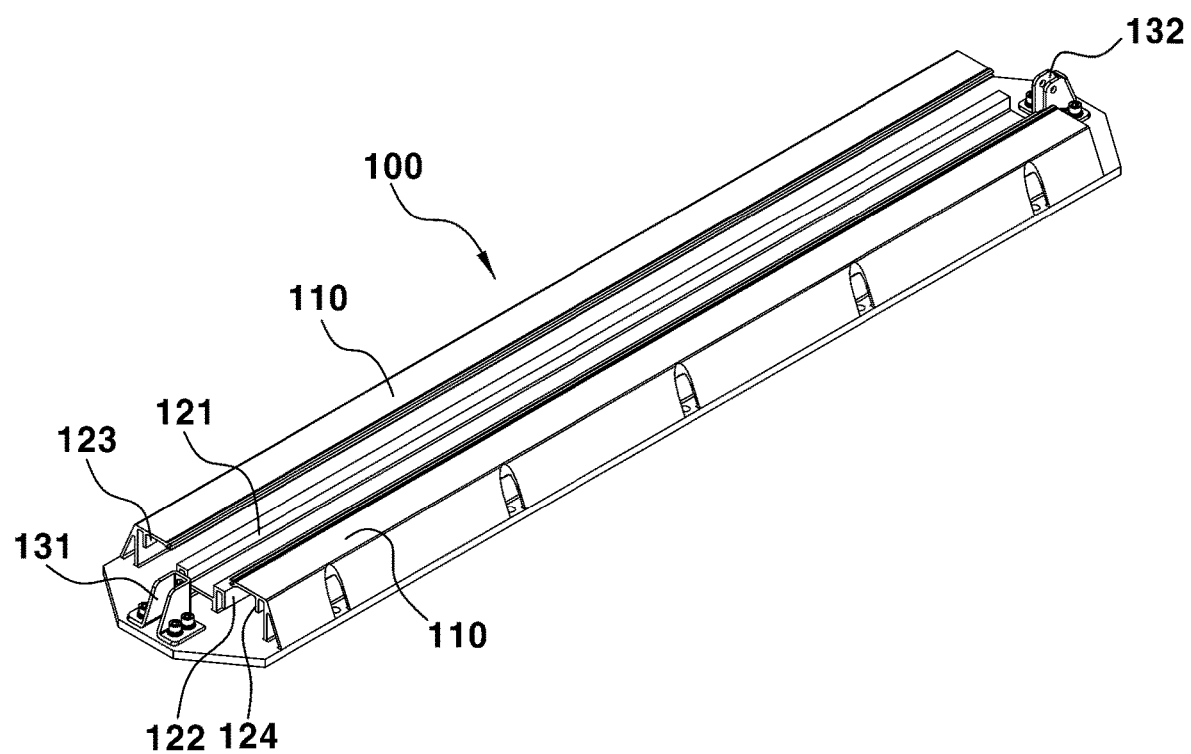
FIG. 6 is a perspective view illustrating a lower rail of the seat track mechanism according to the exemplary embodiment.

In connection with this, FIGS. 5 and 6 illustrate the upper rail 200 and the lower rail 100 in the seat track mechanism 10 according to the exemplary embodiment of the present disclosure, respectively. FIG. 7 shows a cross-section of the seat track mechanism taken along line B-B' in FIG. 2.

As illustrated in FIG. 7, in the seat track mechanism 10 according to the exemplary embodiment of the present disclosure, hook type rail guides formed at the upper rail 200 and the lower rail 100 hook-engage with one another while extending in a sliding direction of the upper rail 200 and alternating with one another.

In detail, as illustrated in FIG. 7, the lower rail 100 includes four hook guides 121, 122, 123 and 124 formed to extend in a longitudinal direction of the lower rail 100. The hook guides 121, 122, 123 and 124 of the lower rail 100 hook-engage with hook guides 241, 242, 243 and 244 of the upper rail 200. The hook guides 121, 122, 123, 124, 241, 242, 243 and 244 extend from the corresponding upper rail 200 or lower rail 100 in a bent state while forming guide grooves 125, 126, 127, 128, 245, 246, 247 and 248, respectively, and restrain one another in such a manner that one hook guide is fitted in the guide groove formed by another hook guide.

As illustrated in the cross-sectional view of FIG. 7, each hook guide preferably extends in the longitudinal direction of the corresponding seat rail while having an L-shaped cross-section open at one side thereof. Each hook guide may be configured to have one end mounted to the corresponding seat rail, that is, the lower rail 100 or the upper rail 200, and the other end functioning as an engagement end to engage with a portion of another hook guide engaging with the former hook guide. That is, one end of each hook guide in the illustrated embodiment of the present disclosure is mounted to the upper rail 200 or lower rail 100, to be integrated with the upper rail 200 or lower rail 100, and the other end of the hook guide extends from one end of the hook guide while being bent from one end of the hook guide, to form a hook-shaped cross-section. In the present disclosure, the other end of the hook guide is referred to as an "engagement end", for convenience.

In the present disclosure, accordingly, hook engagement of the hook guides means that each hook guide 121, 122, 123, 124 (or 241, 242, 243, 244) of the lower rail 100 (or the upper rail 200) is fitted in the guide groove 245, 246, 247, 248 (or 125, 126, 127, 128) of the upper rail 200 (or the lower rail 100) adjacent to the former hook guide of the lower rail 100 (or the upper rail 200) and, as such, the former and latter hook guides engage with each other in a state allowing sliding movement of the upper rail 200 while restraining relative movement therebetween in other directions by the engagement ends thereof. Of course, in this case, the engagement end of the hook guide 241, 242, 243, 244 (or 121, 122, 123, 124) of the upper rail 200 (or the lower rail 100) may also be fitted in the guide groove 125, 126, 127, 128 (or 245, 246, 247, 248) of the lower rail 100 (or the upper rail 200) adjacent to the hook guide of the upper rail 200 (or the lower rail 100). Accordingly, since the upper rail 200 and the lower rail 100 engage with each other by means of the hook guides, as shown in FIG. 7, the upper rail 200 and the lower rail 100 may restrain each other when relative movement therebetween in longitudinal and lateral directions is generated.

In addition, in accordance with the illustrated embodiment of the present disclosure, each of the upper rail 200 and lower rail 100 may be configured to include four hook guides (241, 242, 243, 244 for the upper rail 200 and 121, 122, 123, 124 for the lower rail 100), as illustrated in FIG. 7. As hook engagement is achieved at at least four places of the seat rail, it may be possible to effectively avoid separation of the lower rail 100 upon head-on or rear-end collision. That is, as illustrated in FIGS. 6 and 7, a first lower hook guide designated by reference numeral "121" and a second lower hook guide designated by reference numeral "122" are symmetrically formed at a central portion of the lower rail 100, and a third lower hook guide designated by reference numeral "123" and a fourth lower hook guide designated by reference numeral "124" are symmetrically formed at opposite sides of the central portion of the lower rail 100 outside the first and second lower hook guides 121 and 122, respectively.

Similarly, as illustrated in FIGS. 6 and 7, first to fourth upper hook guides designated by reference numerals "241", "242", "243", and "244" are formed on the upper rail 200 at positions corresponding to the first to fourth lower hook guides 121, 122, 123, and 124, to engage with the first to fourth lower hook guides 121, 122, 123, and 124, respectively.

In this case, the first and second upper hook guides 241 and 242 are formed at a lower surface of the body 210, namely, a central body, of the upper rail 200 connected to the monopost 30, and the third and fourth upper hook guides 243 and 244 are formed at the wings 220a and 220b extending from opposite sides of the central body 210, respectively. Preferably, the rollers 270a and 270b are installed in plural at the wings 220a and 220b of the upper rail 200, respectively, to be arranged in a longitudinal direction of the upper rail 200. Preferably, the third and fourth upper hook guides 243 and 244 are formed outside the rollers 270a and 270b with reference to the center of the upper rail 200, respectively. That is, left rollers, that is, the rollers 270a, are mounted on the upper rail 200, preferably, the wing 220a of the upper rail 200, between the first upper hook guide 241 and the third upper hook guide 243, and right rollers, that is, the rollers 270b, are mounted on the upper rail 200, preferably, the wing 220b of the upper rail 200, between the second upper hook guide 242 and the fourth upper hook guide 244.

In this case, the hook guides are arranged in pair at opposite sides of the left and right rollers 270a and 270b with reference to the bottom surfaces of the left and right rollers 270a and 270b as contact surfaces between the upper rail 200 and the lower rail 100. Accordingly, it may be possible to effectively cope with longitudinal and lateral impact. Although the illustrated embodiment illustrates an example in which respective pairs of rollers 270a and 270b are installed at opposite sides, namely, left and right sides, as shown in FIG. 4, the number of rollers may be varied. For example, 4, 6, or 8 rollers may be arranged at the lower portion of the upper rail 200. On the other hand, only two rollers may be arranged at a central portion of the body 210 while being longitudinally aligned. In this case, the rollers 270a and 270b preferably have a sufficient width to provide a sufficient contact area with respect to the lower rail 100.

In addition, as illustrated in FIG. 7, the engagement ends of the hook guides 241, 242, 243, 244 in the upper rail 200 and the engagement ends of the hook guides 121, 122, 123, 124 in the lower rail 100 should be oriented in opposite directions.

Here, the orientation direction of each engagement end means the direction in which the associated hook guide extends from the upper rail 200 or the lower rail 100 when viewed in cross-section. Accordingly, the hook guides 241, 242, 243, 244 of the upper rail 200 preferably extend upward, and the hook guides 121, 122, 123, 124 of the lower rail 100 preferably extend downward, as shown in FIG. 7. Although FIG. 7 illustrates an example in which corresponding ones of the hook guides extend vertically in opposite directions, the extension directions of the hook guides are not limited to the vertical directions as shown in FIG. 7. For example, the hook guides may be formed to have certain inclination with respect to the vertical directions.

Meanwhile, the engagement height of the first and second lower hook guides 121 and 122 as central lower hook guides preferably differs from the engagement height of the third and fourth lower hook guides 123 and 124 as outer lower hook guides, in view of strength reinforcement. Here, the "engagement height" is defined by an arithmetic average value of the bottom height in each of the guide grooves 125, 126, 127 and 128 and the height of the corresponding engagement end. That is, points, at which the upper rail 200 is restrained by the lower rail 100 upon head-on or rear-end collision in an engaged state of the hook guides according to an embodiment of the present disclosure, are the bottom position of each guide groove and the tip position of the corresponding engagement end when view in cross-section. In the present disclosure, accordingly, the arithmetic average value of the heights of the two positions providing substantial restraint is referred to as an "engagement height".

For example, as illustrated in FIG. 7, the engagement heights of the first and second lower hook guides 121 and 122 as the central lower hook guides may be set to be equal with reference to the lower surface of the lower rail 100, and to be positioned at a higher level than the engagement heights of the third and fourth lower hook guides 123 and 124 as the outer lower hook guides, which may be set to be equal with reference to the lower surface of the lower rail 100. When the engagement heights of the hook guides are set to be different, it may be possible to provide different engagement heights of the hook guides at different positions and, as such, it may be possible to achieve effective contribution to strength reinforcement even upon collision in various directions and to avoid separation of the seat upon collision.

As described above, the upper hook guides 241, 242, 243 and 244 are formed at the body 210 and the wings 220a and 220b in the upper rail 200, respectively, and provide a coupling structure achieving hook engagement at at least four places together with the lower hook guides 121, 122, 123 and 124 of the lower rail 100, and, as such, sufficient strength reinforcement may be achieved even in the monopost structure.

Although the illustrated embodiment illustrates hook engagement at four places, an example in which hook engagement at more than four places is achieved may be applied, differently from the example of FIG. 7.

Meanwhile, in a hook-coupled state of the upper rail 200 and the lower rail 100, the hook guides 121, 122, 123, 124, 241, 242, 243, 244 for hook engagement do not come into contact with each other during normal sliding operation of the upper rail 200. That is, in accordance with the illustrated embodiment, the upper hook guides 241, 242, 243 and 244 are arranged to be spaced apart from the lower hook guides 121, 122, 123 and 124 by a predetermined distance, as shown in FIG. 7. Meanwhile, retainers 260a and 260b are interposed between the upper rail 200 and the lower rail 100 and, as such, eliminate the space between upper rail 200 and the lower rail 100. The retainers 260a and 260b may be installed in the longitudinal direction of the upper rail 200. Preferably, the retainers 260a and 260b function to support uniform load while being in surface contact with the upper rail 200 and the lower rail 100.

In particular, each of the retainers 260a and 260b is configured to have a hollow structure 262 therein. Preferably, each of the retainers 260a and 260b is fixedly mounted on the lower rail 100 while being completely in close contact with the upper rail 200 by means of the inner hollow structure 262. For example, as illustrated in FIG. 7, each of the retainers 260a and 260b may be formed with protrusions 261 extending toward contact surfaces of the lower rail 100 to contact the retainer 260a or 260b. The retainers 260a and 260b, which are mounted on the upper rail 200, may come into close contact with the inner surface of the lower rail 100 via the protrusions 261 and, as such, may be press-fitted between the upper rail 200 and the lower rail 100. When press-fitted, the retainers 260a and 260b are deformed inwards via the hollow structures 262 thereof and, as such, the lower rail 100 and the upper rail 200 may elastically support each other. Meanwhile, the retainers 260a and 260b may be made of plastic.

Thus, the clearance between the upper rail 200 and the lower rail 100 may be offset by the retainers 260a and 260b having the above-described structure. As a result, during sliding operation, it may be possible to avoid generation of vibration and noise and to minimize power loss.

Alternatively, the retainers 260a and 260b may be mounted on the lower rail 100, differently from the case of FIG. 4. In this case, each of the retainers 260a and 260b should be mounted on the lower rail 200 throughout the entire length of the lower rail 100.

The vehicle seat track mechanism 10 having the above-described configuration has advantages in that the vehicle seat track mechanism 10 is connected to the seat by the monopost in accordance with application of the monotrack structure and, as such, may obtain improved aesthetics of the seat 20 while appropriately coping with various seat movements applicable to autonomous vehicles. Although the monopost is applied, sufficient strength performance coping with head-on or rear-end collision may be secured and, as such, there is an advantage in that vehicle stability may be maintained.

Meanwhile, a gap should be present between the upper rail and the lower rail in the seat track mechanism 10 in order to avoid need of excessive operating force for sliding operation between the upper rail and the lower rail. Of course, when the gap between the upper rail 200 and the lower rail 100 is excessive, the user may feel lateral shaking of the seat due to a lateral clearance of the seat track mechanism 10 and, as such, ride comfort may be deteriorated.

To this end, an exemplary embodiment of the present disclosure is characterized by providing a locking mechanism 1000 capable of variably controlling an inter-rail gap in such a manner that a predetermined gap is formed between the upper rail 200 and the lower rail 100 during sliding operation in order to avoid loss of operating force, and the gap between the upper rail 200 and the lower rail 100 is reduced in a stopped or fixed state of the seat in order to reduce shaking.

In particular, the locking mechanism 1000 of the seat track mechanism 10 according to the exemplary embodiment of the present disclosure is disposed between vertical members such as the hook guides 121, 122, 123, 124 of the lower rail while forming a predetermined gap. In the present disclosure, such a gap is referred to as a "rail gap". The rail gap is defined to mean the space between the locking mechanism 100 and the lower rail 100. In particular, in the exemplary embodiment of the present disclosure, the rail gap may have the same function as the space between the upper rail 200 and the lower rail 100 in practice because the locking mechanism 1000 is fixedly mounted on the upper rail 200.

The rail gap may be variably controlled in accordance with operation of inner constituent elements of the locking mechanism 1000. In particular, the locking mechanism 1000 is configured to have a gap size varied upon head-on or rear-end collision or sudden stop to differ from a gap size in a normal state such as operation of the seat 20 or stop of the seat 20.

In detail, when the seat track mechanism 10 carries out normal sliding operation, that is, when the upper rail 200, on which the seat 20 is mounted, slides on the lower rail 100, the locking mechanism 1000 mounted on the upper rail 200 is maintained in a state in which a predetermined gap is formed between the locking mechanism 1000 and the lower rail 100. The rail gap in this state may have a maximum gap size.

On the other hand, when a situation such as sudden stop of the seat 20 or head-on or rear-end collision of the vehicle occurs, the locking mechanism 1000 operates to substantially eliminate the gap between the lower rail 100 and the locking mechanism 1000.

For this function, the locking mechanism 1000 according to the illustrated embodiment of the present disclosure includes a center case 1200 fixedly mounted on the upper rail 200, and a center plate 1100 disposed within the center case 1200 in such a manner that the center plate 1100 moves alone or together with the center case 1200.

In particular, in the seat track mechanism 10 including the locking mechanism 1000 according to the illustrated embodiment, the driver thereof is not directly mounted to the upper rail 200, but is mounted to the center plate 1100 of the locking mechanism 1000. In the illustrated embodiment of the present disclosure, the driver is illustrated as including the motor, the lead screw, and the nut member. Here, mounting of the driver on the center plate 1100 means that the motor or the nut member, on which the motor is mounted, is mounted on the center plate 1100.

Meanwhile the center case 1200, in which the center plate 1100 is received, is mounted on the upper rail 200, preferably, the lower portion of the upper rail 200.

In addition, in accordance with the illustrated embodiment, the center case 1200 and the upper rail 200 are movable together in link with the center plate 1100, on which the motor 320 or the nut member 330 is mounted, in order to slide the seat 20 by driving force of the motor 320. To this end, the center plate 1100 and the center case 1200 are configured to secure sufficient surface contact therebetween in order to enable transmission of driving force of the center plate 1100 to the center case 1200 and the upper rail 200.

Hereinafter, the locking mechanism 1000 of the seat track mechanism according to the illustrated embodiment of the present disclosure will be described with reference to the annexed drawings.

Figure 8:
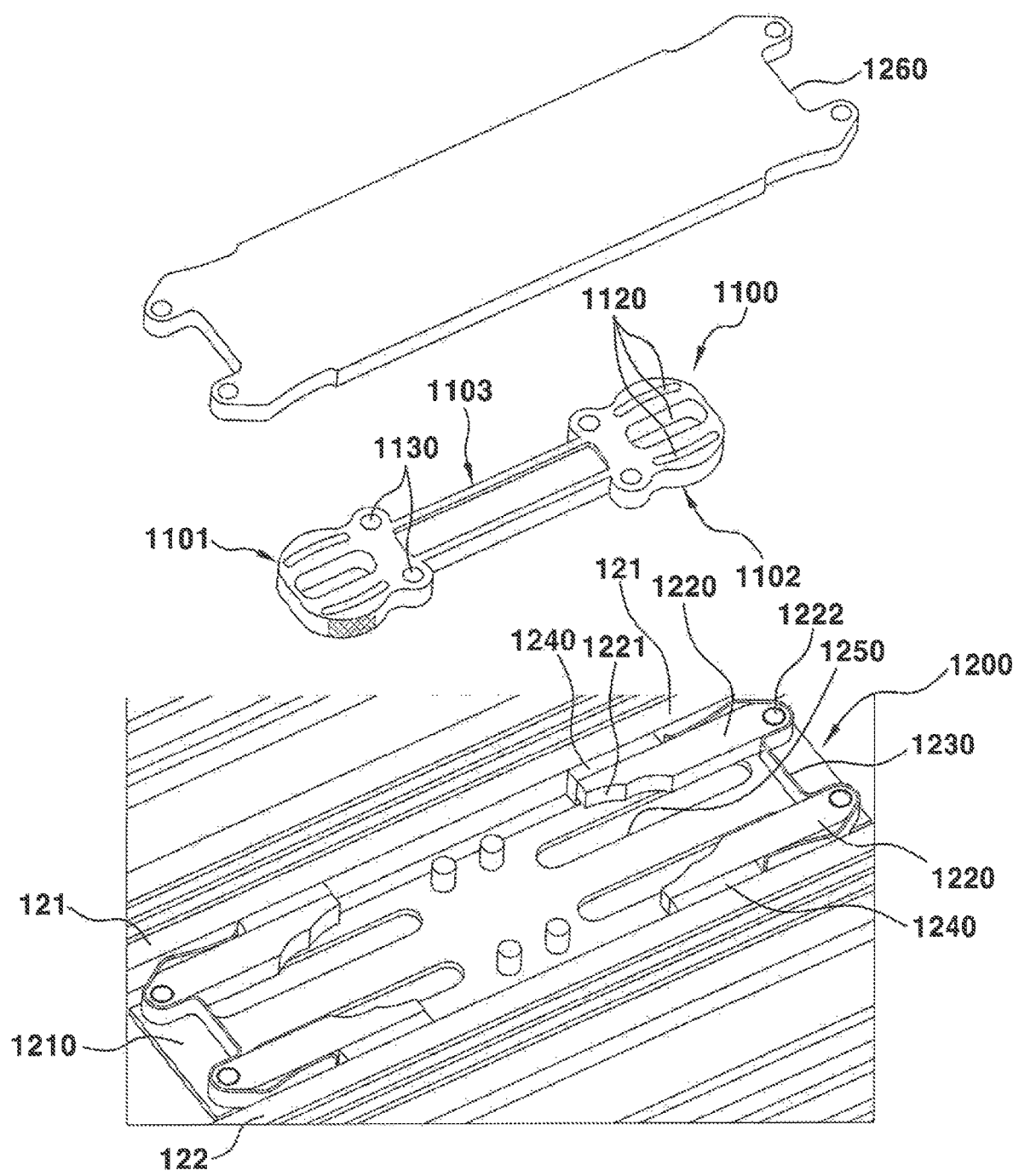
FIG. 8 is a perspective view illustrating a center plate and a center case in a locking mechanism according to an exemplary embodiment of the present invention.
Figure 9:
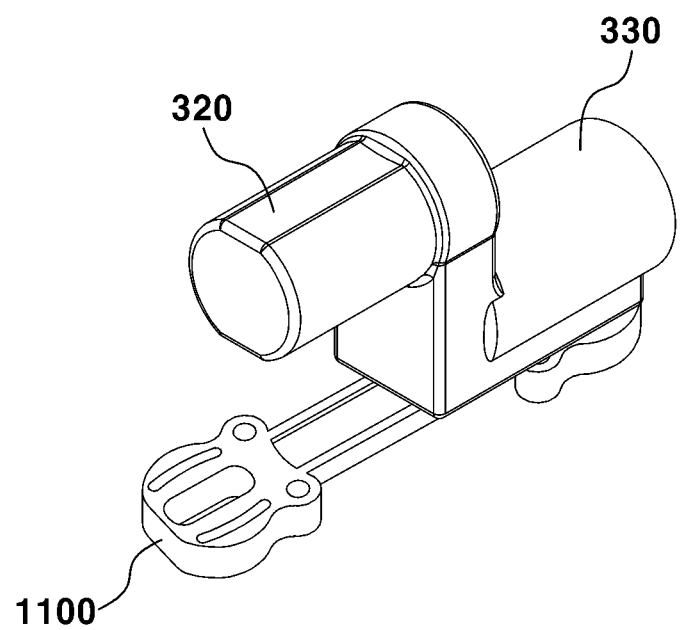
FIG. 9 is a perspective view illustrating the center plate of the locking mechanism according to the exemplary embodiment of the present invention and a nut member fastened to the center plate.
Figure 10A:
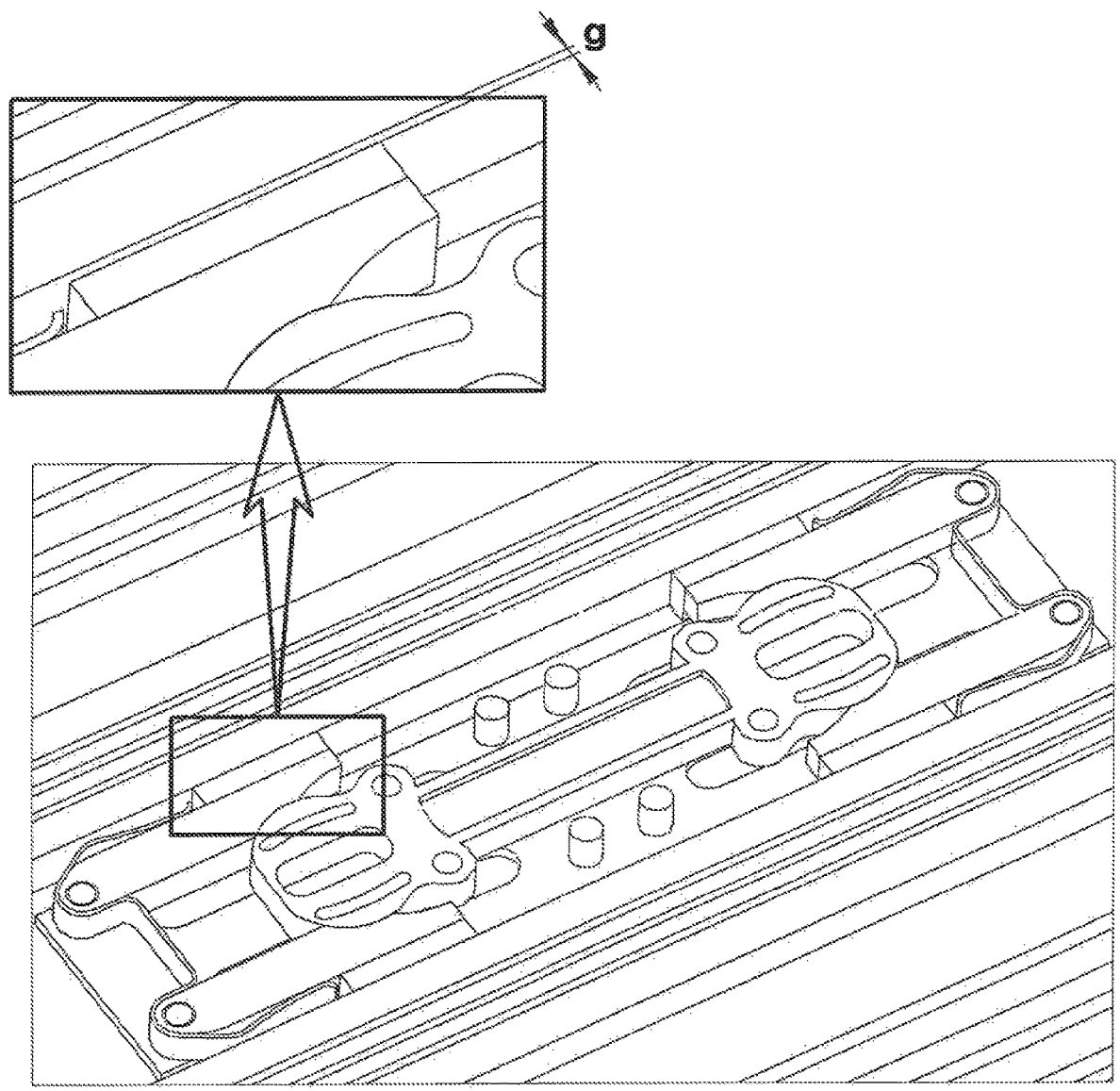
FIGS. 10A and 10B are perspective views illustrating operation states of the locking mechanism mounted to a lower portion of the upper rail in the seat track mechanism according to the exemplary embodiment of the present invention, respectively.
Figure 10B:
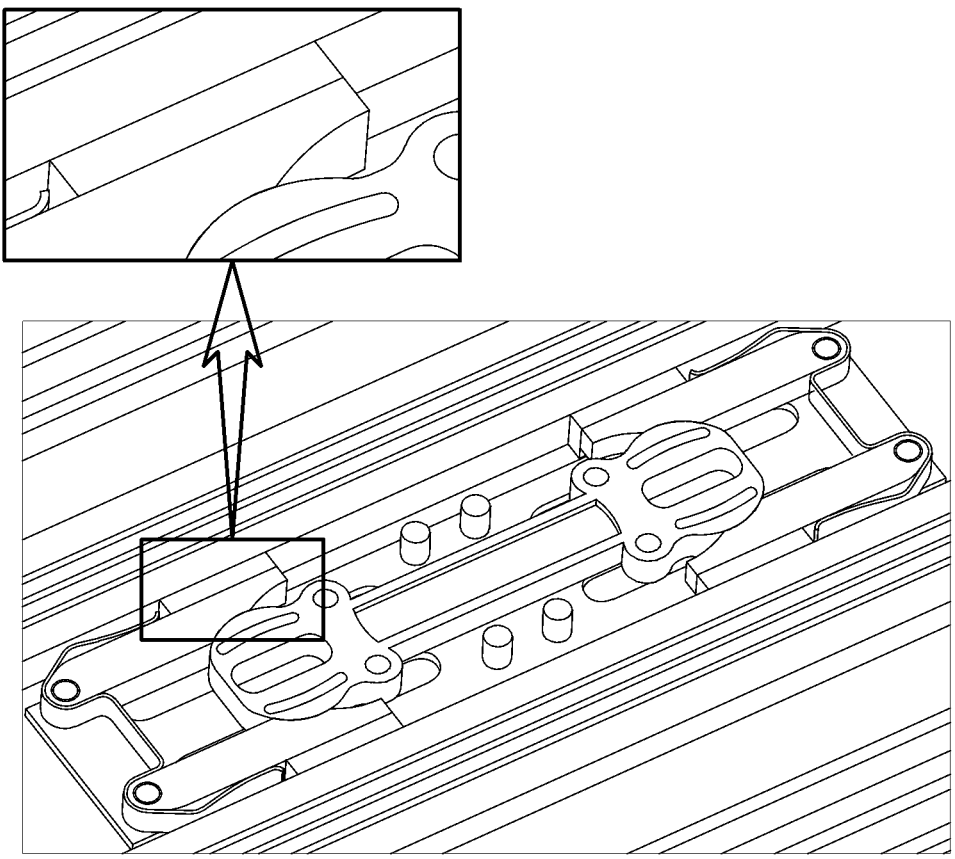

FIG. 8 illustrates the center plate 1100 and the center case 1200 in the locking mechanism 1000 according to the illustrated embodiment of the present disclosure. FIG. 9 illustrates fastening of the center plate 1100 to the nut member 330. FIGS. 10A and 10B illustrate operation states of the locking mechanism 1000 according to the illustrated embodiment, respectively.

As illustrated in FIGS. 10A and 10B, the locking mechanism 1000 according to the illustrated embodiment is disposed between the inner hook guides 121 and 122 of the lower rail 100, to variably control a gap between the lower rail 100 and the locking mechanism 1000.

Basically, the center plate 1100, which is disposed within the center case 1200, is mounted to the nut member 330, to be integrated with the nut member 330, and is configured to transmit driving force of the motor 320 to the center case 1200 in accordance with driving of the motor 320. To this end, the center plate 1100 is disposed to be in close contact with the center case 1200. In addition, the center plate 1100 is preferably in close contact with the center case 1200 at both the front and rear sides thereof in order to transmit driving force to the center case in either forward or rearward movement thereof according to driving of the motor.

Of course, the above-described arrangement is an illustrative example for maximizing the efficiency with which driving force of the motor 320 is transmitted. The center plate 1100 may be disposed to be slightly spaced apart from an inner surface of the center case 1200. In this case, there is an ineffective rotation period of the motor 320 corresponding to the distance between the center plate 1100 and the center case 1200. After the ineffective rotation period elapses, driving force of the motor 320 is transmitted as actuating force to move the entirety of the locking mechanism 1000 including the center case 1200. When the distance between the center plate 1100 and the center case 1200 is excessively great, impact may be generated upon contact between neighboring constituent elements. Furthermore, the passenger seated in the seat 20 may feel unfamiliarity upon movement of the seat 20 due to the ineffective rotation period. Therefore, it is desirable for the distance not to be excessively great.

A detailed structure of the center plate 1100 associated with the above-described configuration is illustrated in FIG. 8. As illustrated in FIG. 8, the center plate 1100 according to the illustrated embodiment includes a pair of pressing heads 1101 and 1102, and a rod 1103 connecting the pressing heads 1101 and 1102. In addition, mounting holes 1130 may be formed through the pressing heads 1101 and 1102, to mount the motor-mounted nut member 330 to the pressing heads 1101 and 1102. The nut member 330 may be fastened to the pressing heads 1101 and 1102 by fastening members such as bolts fastened through the mounting holes 1130.

Of course, the mounting position of the nut member 330 is not limited to the pressing heads 1101 and 1102. There is no limitation as to the mounting position of the nut member 330 so long as the center plate 1100 can move together with the nut member 330 in accordance with driving of the motor. For example, the nut member 330 may be mounted on the rod 1103 of the center plate 1100.

Meanwhile, the illustrated embodiment illustrates the example including a pair of pressing heads 1101 and 1102. In connection with this, the pressing heads 1101 and 1102 function to press the center case 1200 upon forward movement and rearward movement of the seat, respectively. For example, upon forward movement of the seat 20, the pressing head 1101, which is a front or first pressing head, may press the center case 1200. Upon rearward movement of the seat, the pressing head 1102, which is a rear or second pressing head, may press the center case 1200. In this case, the center plate 1100 including the first pressing head 1101 and the second pressing head 1102 may have a symmetrical structure.

The pressing heads 1101 and 1102 of the center plate 1100 have actuating surfaces at respective ends thereof in order to press respective fingers 1220 of the center case 1200. The actuating surfaces of the pressing heads 1101 and 1102 are configured to press the fingers 1220 of the center case 1200 to be described later.

To this end, each of the pressing heads 1101 and 1102 has round actuating surfaces facing respective head contact surfaces 1221 of the corresponding fingers 1220. Each actuating surface may be configured to contact the corresponding head contact surface 1221 at at least a portion thereof.

In addition, one or more cavities 1120 may be formed in each of the pressing heads 1101 and 1102. The cavities 1120 may provide elasticity to the associated pressing head 1101 or 1102 during pressing operation of the associated pressing head 1101 or 1102.

Meanwhile, one pressing head, for example, the pressing head 1101, may be connected to the rod 1103, and the rod 1103 may be connected to the other pressing head, for example, the pressing head 1102. In this case, the center plate 1100 has a longitudinally symmetrical structure. The front pressing head may be referred to as a "first pressing head 1101", and the rear pressing head may be referred to as a "second pressing head 1102".

In addition, as illustrated in FIG. 9, the motor-mounted nut member 330 in the seat track mechanism 10 according to the illustrated embodiment is mounted to the first pressing head 1101 and, as such, driving force of the motor is transmitted to the second pressing head 1102 via the rod 1103.

A detailed configuration of the center case 1200 operating together with the center plate 1100 including the pressing heads 1101 and 1102 is illustrated in FIG. 8. The center case 1200 is mounted to the upper rail. Preferably, the center case 1200 is disposed beneath a central portion of the upper rail 200. The center case 1200 is a case for receiving the center plate 1100. In regard with this, the center case 1200 may include a lower case 1210 disposed beneath the center plate 1100, and an upper case 1260 disposed over the center plate 1100. Of course, the upper case 1260 may be omitted, and the lower case 1210 may be mounted directly on the lower surface of the upper rail 200.

The lower case 1210 is mounted to the upper rail 200 by means of a plurality of fastening members such as bolts. As illustrated in FIG. 8, front and rear ones of the fastening members may function as hinge points 1222 for the fingers 1220, differently from central ones of the fastening members.

In addition, slots 1250 may be formed through the lower case 1210 for fastening members fastened through the mounting holes 1130 of the pressing heads 1101 and 1102. Accordingly, even when the fastening members protrude outwards of the pressing heads 1101 and 1102, the protruded fastening members may move within the slots 1250. Thus, the slots 1250 provide spaces allowing the fastening members fastened to the pressing heads 1101 and 1102 to move during forward or rearward movement of the center plate 1100.

Additional slots 1250 may also be formed through the upper case 1260 at the same positions as the slots 1250 of the lower case 1210, respectively. Fastening members extend through the slots 1250 of the upper case 1260 and connect the nut member 330 and the center plate 1100. Although not shown, slots 1250 having the same shape as the above-described slots 1250 may be formed at the lower surface of the lower rail 100.

As illustrated in FIG. 8, the center case 1200 according to the illustrated embodiment is configured to have a symmetrical structure and to include four fingers 1220 operating together with the pressing heads 1101 and 1102 of the center plate 1100.

The fingers 1220 associated with each of the pressing heads 1101 and 1102 are hinged at opposite sides of the associated pressing head 1101 or 1102, respectively, in such a manner that the fingers 1220 can contact the actuating surfaces of the pressing head 1101 or 1102. As illustrated in FIG. 8, as the fingers 1220 are hinged at the hinge points 1222 of the center case 1200, the fingers 1220 are rotatable in a direction pressing the lower rail or in a direction releasing pressing of the lower rail.

The head contact surface 1221 of each finger 1220 contacts the corresponding actuating surface of the associated pressing head 1101 or 1102. Preferably, the head contact surface 1221 is configured to have a shape corresponding to the corresponding actuating surface of the associated pressing head 1101 or 1102. In detail, each finger 1220 may be configured to have the shape of a bar rotating about the associated hinge point 1222. Preferably, the head contact surface 1221, which is an inner surface of the finger 1220, has a curved shape such that the head contact surface 1221 may closely contact the corresponding actuating surface of the associated pressing head 1101 or 1102.

For example, each finger 1220 may have a bar shape having an inwardly-recessed curved surface. The curved surface becomes the head contact surface 1221. The head contact surface 1221 of each finger 1220 and the corresponding actuating surface of the associated pressing head 1101 or 1102 should transmit force in a sliding direction. When great force is exerted from the pressing heads 1101 and 1102, the head contact surface 1221 of each finger 1220 and the corresponding actuating surface of the associated pressing head 1101 or 1102 should apply pressing force to the finger 1220 in a finger widening direction.

Accordingly, the head contact surface 1221 of each finger 1220 and the corresponding actuating surface of the associated pressing head 1101 or 1102 should be formed to provide both a force component in a direction parallel to the sliding direction and a force component perpendicular to the sliding direction. Furthermore, each finger 1220 should be exceptionally widened only when sudden acceleration variation such as sudden stop of the vehicle or head-on or rear-end collision of the vehicle occurs.

To this end, it is desirable to appropriately form the head contact surface 1221 of each finger 1220 such that the force component parallel to the sliding direction in the force transmitted from the associated pressing head 1101 or 1102 is sufficiently greater than the force component perpendicular to the sliding direction in the transmitted force.

If the force component perpendicular to the sliding direction in the force transmitted from each of the pressing heads 1101 and 1102 is great, the rail gap is recued due to the force transmitted from the pressing heads 1101 and 1102 during driving of the motor and, as such, movement of the upper rail may be restrained. Therefore, the head contact surface 1221 of each finger 1220 should be formed mainly to transmit force in the sliding direction.

In addition, elastic members 1230 may be installed around respective fingers 1220, to provide restoring force for narrowing the fingers 1220 inwards. Preferably, each elastic member 1230 may be a C-shaped plate spring adapted to exert inward force. The plate spring is adapted to press the outer surface of the associated finger 1220. When initial load of the elastic member 1230 is appropriately controlled, the elastic member 1230 may press the finger 1220 inwards by a predetermined level of force.

Accordingly, when force smaller than the initial load of the elastic member 1230 under the condition that the initial load is appropriately controlled (that is, the force perpendicular to the sliding direction is smaller than the initial load of the elastic member 1230), it is possible to transmit driving torque of the motor in the sliding direction while maintaining a desired rail gap.

Meanwhile, the surface of each pressing head 1101 or 1102 opposite to the head contact surface 1221 of the pressing head 1101 or 1102 functions as a pressing surface for pressing the associated finger 1220. In addition, pressing pads 1240 may be disposed outside respective fingers 1220. The pressing pads 1240 are interposed between respective fingers 1220 and the lower rail and, as such, the fingers 1220 press respective pressing pads 1240 while being widened. In this case, when the gap between each pressing pad 1240 and the lower rail is reduced, and is sufficiently pressed by the associated finger 1220, the side of the gap becomes zero and, as such, a press fit state between the locking mechanism 1000 and the lower rail may be obtained. Preferably, the number of the pressing pads 1240 is equal to the number of the fingers 1220. In addition, the pressing pads 1240 may be arranged to correspond to the finger protrusions 1221 of the fingers 1220, respectively.

Each pressing pad 1240 may be made of metal or plastic, and may be mounted on the lower case 1210 or may be mounted to the pressing surface of the associated finger 1220.

Hereinafter, detailed operation of the locking mechanism 1000 according to the illustrated embodiment will be described with reference to FIGS. 10A and 10B.

FIG. 10A illustrates a normal state in which the seat 20 moves forward or rearward. FIG. 10B illustrates a state in which locking is generated due to sudden forward or rearward movement of the center plate occurring upon head-on or rear-end collision of the vehicle or sudden stop of the vehicle.

As illustrated in FIG. 10A, in a normal seat movement operation, the pressing heads 1101 and 1102 transmit force to the center case 1200 via the fingers 1220 and, as such, the center case 1200 moves together with the upper rail 200 mounted thereto. In this case, a sufficient gap g is maintained between the lower rail 100 and the locking mechanism 1000.

On the other hand, in a situation such as sudden stop of the vehicle or head-on or rear-end collision of the vehicle, acceleration variation of the vehicle increases abruptly. In this case, the vehicle seat 20 tends to move forward or rearward due to inertia. As a result, the center case 1200 directly connected to the vehicle seat 20 moves forward or rearward together with the vehicle seat 20, whereas the center plate 1100 is maintained at the present position thereof because the center plate 1100 is in a fixed state by the motor 320. Accordingly, a relative displacement difference is generated between the center case 1200 and the center plate 1100. As a result, the fingers 1220 of the center case 1200 are laterally widened and as such, a press fit condition is established between the center case 1200 and the lower rail 100.

In detail, FIG. 10B illustrates a locking state between the center case 1200 and the lower rail 100 established in a situation in which vehicle acceleration variation is equal to or greater than a predetermined reference value, as in sudden stop of the vehicle or head-on or rear-end collision of the vehicle.

As illustrated in FIG. 10B, when a relative displacement difference is generated between the center case 1200 and the center plate 1100, the fingers 1220 press the pressing pads 1240 disposed at opposite outer sides of the fingers 1220 while being widened outwards. As a result, the gap between each pressing pad 1240 and the lower rail 100 disappears and, as such, a press fit state is established between the lower rail 100 and the locking mechanism 1000. In this state, the gap between the upper rail 200 and the lower rail 100 disappears substantially and, as such, lateral movement of the seat 200 is avoided.

Meanwhile, when a sudden stop situation or a collision situation is ended, great force applied from the center case 1200 to the pressing heads 1101 and 1102 of the center plate 1100 disappears due to forward or rearward movement of the seat 20. Accordingly, the center plate 1100 returns to an original position thereof by virtue of restoring force of the elastic members 1230. The rail gap is also restored to a normal level. As a result, the seat 20 returns to a state enabling normal forward and rearward movement thereof.

In accordance with an embodiment of the present disclosure, a seat track mechanism 10 including a monotrack mechanism having a single rail structure is provided. Accordingly, the structure of the seat bottom may be simplified and, as such, it may be possible to achieve a reduction in manufacturing costs and an elegant and slim design of the seat bottom.

In addition, in accordance with an embodiment of the present disclosure, the seat track mechanism 10 has a cross-sectional structure capable of minimizing vertical/lateral clearance between upper and lower rails 200, 100 included in the monotrack mechanism, thereby effectively preventing movement of the seat 20 and damage to the seat 20.

Furthermore, in accordance with an embodiment of the present disclosure, the strength of the seat track mechanism 10 is variably reinforced even in a situation such as head-on or rear-end collision or sudden stop of the vehicle and, as such, an improvement in passenger safety is achieved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A seat track mechanism for a vehicle, the seat track mechanism comprising:
   a lower rail configured to be mounted to a body of the vehicle;

an upper rail configured to be mounted to a seat of the vehicle, the upper rail movable forward and rearward along the lower rail; and a locking mechanism mounted to the upper rail, the locking mechanism configured to adjust a rail gap between the locking mechanism and the lower rail for restraining movement of the upper rail;

wherein the locking mechanism comprises:

a center case mounted on the upper rail;

a center plate received in the center case, the center plate contacting the center case for transmitting an actuating force to the center case; and a driver for providing the actuating force to move the upper rail forward and rearward along the lower rail;

wherein the center plate is mounted to the driver;

wherein the center case comprises a finger hinged to the upper rail and having an inner head contact surface;

wherein the center plate comprises a pressing head contacting the inner head contact surface of the finger; and wherein when a relative displacement difference is generated between the center case and the center plate due to a vehicle acceleration variation equal to or greater than a predetermined reference value, the locking mechanism presses the lower rail such that the inner head contact surface of the finger moves towards the lower rail.

2. The seat track mechanism according to claim 1, wherein the driver comprises:

a lead screw rotatably mounted to the lower rail;

a motor for rotating the lead screw; and a nut member mounted to the upper rail and formed with female threads having a shape corresponding to a shape of male threads of the lead screw, the nut member configured to move forward and rearward based on rotation of the lead screw.

3. The seat track mechanism according to claim 1, wherein the pressing head has a round actuating surface facing the inner head contact surface of the finger, and at least a portion of the round actuating surface of the pressing head contacts the inner head contact surface of the finger.

4. The seat track mechanism according to claim 1, wherein at least one cavity is formed within the pressing head.

5. The seat track mechanism according to claim 1, wherein:

the center case further comprises a lower case supporting the center plate, and an upper case assembled to the lower case and mounted to a lower portion of the upper rail; and the finger is hinged to the lower case.

6. The seat track mechanism according to claim 1, wherein the actuating force of the driver is adapted to be transmitted to the center case such that the pressing head of the center plate mounted to the driver presses the inner head contact surface of the finger.

7. The seat track mechanism according to claim 6, wherein the finger has a pressing surface opposite to the inner head contact surface of the finger, and a pressing pad is disposed between the pressing surface of the finger and the lower rail.

8. The seat track mechanism according to claim 7, wherein the pressing pad is mounted on the center case such that a predetermined gap is maintained between the pressing pad and the lower rail when the pressing pad is not pressed by the finger, and the pressing pad contacts the lower rail when the pressing pad is pressed by the finger.

9. The seat track mechanism according to claim 1, wherein an elastic member is mounted on the center case for providing a restoring force to keep the rail gap between the locking mechanism and the lower rail.

10. The seat track mechanism according to claim 9, wherein the elastic member is a plate spring for applying an inward force to the finger away from the lower rail.

11. The seat track mechanism according to claim 1, wherein:

the lower rail comprises a hook guide;

the locking mechanism is disposed adjacent to the hook guide; and the rail gap between the locking mechanism and the lower rail is reduced to zero when the locking mechanism presses the hook guide.

12. The seat track mechanism according to claim 1, wherein:

the pressing head of the center plate is a first pressing head;

the finger of the center case is a first finger;

the center plate has a symmetrical structure comprising the first pressing head, a rod connected to the first pressing head, and a second pressing head connected to the rod; and the center case further comprises a second finger contacting the second pressing head.

13. The seat track mechanism according to claim 1, wherein:

the finger of the center case is a first finger;

the center case further comprises a second finger hinged to the upper rail and having an inner head contact surface; and the pressing head of the center plate contacts both the inner head contact surface of the first finger and the inner head contact surface of the second finger.

14. The seat track mechanism according to claim 13, wherein the actuating force of the driver is adapted to be transmitted to the center case such that the pressing head of the center plate mounted to the driver presses both the inner head contact surface of the first finger and the inner head contact surface of the second finger.

15. The seat track mechanism according to claim 14, wherein:

the locking mechanism further comprises a first pressing pad disposed between the first finger and the lower rail;

the locking mechanism further comprises a second pressing pad disposed between the second finger and the lower rail;

the first pressing pad and the second pressing pad are mounted on the center case such that:

when the first pressing pad is not pressed by the first finger and the second pressing pad is not pressed by the second finger, a first predetermined gap is maintained between the first pressing pad and the lower rail and a second predetermined gap is maintained between the second pressing pad and the lower rail; and when the first pressing pad is pressed by the first finger and the second pressing pad is pressed by the second finger, both the first pressing pad and the second pressing pad contact the lower rail.

16. The seat track mechanism according to claim 15, wherein an elastic member is mounted on the center case for providing a first inward force to the first finger away from the lower rail and providing a second inward force to the second finger away from the lower rail.

17. The seat track mechanism according to claim 16, wherein the elastic member is a plate spring.

18. The seat track mechanism according to claim 16, wherein:
- the first pressing pad is disposed on an outer surface of the first finger;
- the elastic member presses the outer surface of the first finger;
- the second pressing pad is disposed on an outer surface of the second finger; and
- the elastic member presses the outer surface of the second finger.

19. The seat track mechanism according to claim 13, wherein an elastic member is mounted on the center case for providing a first inward force to the first finger away from the lower rail and providing a second inward force to the second finger away from the lower rail.

20. The seat track mechanism according to claim 19, wherein the elastic member is a plate spring.

* * * * *